United States Patent [19]

Mohri et al.

[11] Patent Number: 5,264,212
[45] Date of Patent: Nov. 23, 1993

[54] NATURAL RED COLORING MATTER AND ITS PROCESSING METHOD

[75] Inventors: Akira Mohri, Ise; Katsumi Morikawa, Matsusaka; Toshihiko Matsuya, Ise; Setsuo Sato, Mie, all of Japan

[73] Assignees: Mitsui & Co. Ltd., Tokyo; Mohri Oil Mill Co. Ltd., Mie, both of Japan

[21] Appl. No.: 770,275

[22] Filed: Oct. 3, 1991

[30] Foreign Application Priority Data

Oct. 5, 1990 [JP] Japan .................. 2-269056

[51] Int. Cl.$^5$ ............................................. A61K 35/78
[52] U.S. Cl. ................................. 424/195.1; 426/253
[58] Field of Search ...................... 424/195.1; 426/253

[56] References Cited

U.S. PATENT DOCUMENTS 4,400,398  8/1983  Coenen et al. .................. 426/429

FOREIGN PATENT DOCUMENTS 60-176563   9/1985  Japan .
61-242559  10/1986  Japan .
61-268762  11/1986  Japan .
63-112659   5/1988  Japan .
63-258558  10/1988  Japan .
63-310601  12/1988  Japan .
1-123864    5/1989  Japan .
1-281052   11/1989  Japan .
2-38464     2/1990  Japan .

Primary Examiner—John W. Rollins
Attorney, Agent, or Firm—Armstrong, Westerman, Hattori, McLeland & Naughton

[57] ABSTRACT

Impurities containing a pungent taste component are removed from a hot red pepper oleoresin as a starting material therefrom by a supercritical gas extraction method using a carbon dioxide as an extracting reagent, and the extraction residue is used as a red coloring matter. Even when the hot red pepper is used as the raw material, the invention can provide a natural red coloring matter evaluated as having "no pungent taste" by an organoleptic test. When the natural red coloring matter is prepared from the hot red pepper as the raw material by the supercritical gas extraction method, the invention can drastically reduce the gas pressure of the extracting reagent in comparison with the prior art.

2 Claims, 1 Drawing Sheet

NATURAL RED COLORING MATTER AND ITS PROCESSING METHOD

BACKGROUND OF THE INVENTION

1. Field of the Invention

This invention relates to a novel natural red coloring matter completely without the pungent taste obtained from a hot red pepper as a raw material and to its processing method.

The terms used hereinafter in this specification have the following meaning.

(1) Coloring component oil:

A hot red pepper seed oil in which coloring (pigment) components are eluted as a effective component.

(2) Smelling substance oil:

A hot red pepper seed oil in which smelling substances are eluted as a effective component.

(3) Color value:

A color value is determined by the following measurement method.

(1) Preparation of sample solution:

About 0.2 g of a sample is exactly weighed and is completely dissolved in 250 ml of acetone (reagent: JIS first class), and 5 ml of this solution is taken out. Acetone is added to this solution to make a total volume of 100 ml.

2) The sample solution prepared above is placed into a quartz cell (thickness of a liquid layer: 10.0 mm) and absorbance (A) at a wavelength of 460 nm is measured by a spectrophotometer.

3) The result obtained above is substituted for A in the following equation to obtain the color value:

$$\text{color value} = A \times 66{,}000/(w \times 2).$$

(4) Ratio of absorbances:

Absorbances at a wavelength 454 nm and a wavelength of 470 nm are measured in the same way as described above and a ratio of absorbances is calculated according to the following equation:

$$\text{ratio of absorbances} = (\text{absorbance at 470 nm})/(\text{absorbance at 454 nm}).$$

(5) The evaluation "No pungent taste" in an organoleptic test represents the level at which five panelists (two adult males and three adult females each having an ordinary sense of taste) do not feel the pungent taste at their tongue tip.

2. Description of the Prior Art

Recently, natural coloring matters have drawn an increasing attention in place of conventional synthetic coloring matters from the aspect of safety in the fields of foodstuffs and cosmetics. Among the natural coloring matters, the demand for red coloring matters tends to increase more and more.

Conventionally, red natural coloring matters are the carotenoid type pigments (comprising principally capsanthin) extracted and prepared from red peppers (primarily, paprika). A supercritical gas extraction method has drawn a specific attention as the extraction method for preparing the red coloring matter from the red peppers, because this method is free from the problem of denaturation due to a residual organic solvent and to high temperature processing at the time of extraction and can extract and isolate only the coloring component oil at a high yield. Accordingly, various supercritical gas extraction methods have been proposed to this date (e.g. U.S. Pat. No. 4,400,398 and Japanese Patent Laid-Open Publication No. 112,659/1988).

However, it has been believed very difficult to extract the coloring matter without containing any pungent taste components even by the supercritical gas extraction method. Even a trace of the pungent taste in the coloring matter will be detected by the organoleptic test. If judged as "having the pungent taste", the coloring matter can be applied to only specific foodstuffs and its application is drastically limited. Accordingly, the red peppers as the starting material for the coloring matters have predominantly been sweet red peppers such as paprika.

On the other hand, the share of the hot red peppers in the worldwide production quantity is from about 70 to 80% and the rest are the sweet red peppers, i.e. 20 to 30%. The hot red peppers, therefore, have higher stability from the aspect of the supply of the raw mateial and can be purchased for about half-price of sweet red peppers as papricas or the like. And, various processes have been proposed in order to extract and isolate the coloring component oils, which hardly contain the pungent taste components, from the hot red peppers by the supercritical gas extraction, as listed below.

① U.S. Pat. No. 4,400,398:

This process comprises a first step of subjecting the dried and pulverized hot red pepper to a primary supercritical gas extraction under the condition of a pressure of from the critical pressure to 150 bars (from the critical pressure to 147 kgf/cm$^2$) and a temperature of from the critical temperature to 70° C., and isolating at a reduced pressure a smelling component oil (containing the pungent taste component) from the extracting solution, and a second step of subjecting the extraction residue of the first supercritical extraction to a secondary supercritical gas extraction under the condition of a pressure of from 150 to 350 bars (147 to 343 kgf/cm$^2$) and isolating at a reduced pressure a coloring component oil from the extracting solution.

② Japanese Patent Laid-Open Publication No. 242559/1986:

This process comprises immersing a Guinea pepper (hot red pepper) in an oil such as a corn oil, a palm oil, or the like, so as to eluate the pungent taste component and the coloring component into the oil, extracting the coloring component under a pressurized condition suitable for the extraction of a coloring component and isolating at a reduced pressure the coloring component oil from the extraction gas.

③ Japanese Patent Laid-Open Publication No. 258558/1988:

This process is fundamentally the same as the process described in item ① above, but the primary gas extraction conditions are a pressure of from the critical pressure to 170 kgf/cm$^2$ and a temperature of from the critical temperature to 85° C. and the secondary critical gas extraction conditions are a pressure of from 170 to 500 kgf/cm$^2$ and a temperature of from the critical temperature to 85° C. Both the primary and secondary critical gas extraction conditions are shifted to a higher pressure side.

However, the results of experiments carried out by the present inventors reveal that it is very difficult to bring the coloring component oil to the level of "No pungent taste" by the evaluation of the organoleptic test by any of the processes described above. In the case of the embodiment (B) of Japanese Patent Laid-Open Publication No. 258558/1988, for example, the residual capsaicin concentration in the coloring component is 0.01% and yet the evaluation result of the organoleptic test proved to be "pungent taste".

When the coloring component oil is extracted by the supercritical gas extraction in accordance with each of the processes described above, the pressure must exceed 150 kgf/cm². Since a ultra-high pressure above 150 kgf/cm² is necessary from the aspect of the yield (the higher the extracting pressure, the higher becomes extraction efficiency of the coloring component oil; the extraction pressure of 450 kgf/cm² is employed in the embodiment described above), the supercritical gas extraction apparatus must withstand the ultra-high pressure and a high level of skill is necessary for various extraction operations.

It is therefore an object of the present invention to provide a natural red coloring matter, which is evaluated as "No pungent taste" in the organoleptic test, produced from the hot red pepper oleoresins by the supercritical gas extraction.

It is another object of the present invention to provide a process for preparing a natural red coloring matter which can drastically reduce the extraction pressure in comparison with the prior art technique during the supercritical gas extraction step when the natural red coloring matters are prepared from the hot red pepper oleoresins.

SUMMARY OF THE INVENTION

As a result of intensive studies in order to solve the problems with the prior art described above, the inventors of the present invention have come to realize that the extraction residue (residual liquor) obtained by removing impurities containing the pungent taste components from the hot red pepper oleoresins proves to have "No pungent taste" as the result of the organoleptic evaluation test, and have accomplished an invention of a novel natural red coloring matter and preparation process thereof.

The natural red coloring matter in accordance with the present invention is characterized in that it comprises an extraction residue obtained by removing the impurities containing the pungent taste component from a hot red pepper oleoresin by a supercritical gas extraction, and its result of evaluation by the organoleptic test is "No pungent taste".

The process for preparing the natural red coloring matter in accordance with the present invention is characterized in that the impurities containing the pungent taste components of the red hot red pepper oleoresin are removed from the oleoresin by a supercritical gas extraction method using carbon dioxide as an extracting reagent and the extraction residue is used as the red coloring matter.

The evaluation result by the organoleptic test of the red coloring matter of the present invention prepared from the hot red pepper oleoresin is "No pungent taste" and therefore can be used for a wide range of applications as a red coloring matter for foodstuffs and cosmetics.

The process for preparing the red coloring matter in accordance with the present invention can be carried out by only the extraction operation using the supercritical carbon dioxide pressure below 200 kgf/cm² and does not need the use of the supercritical gas pressure exceeding 200 kgf/cm², that has been necessary in the prior art, for the extraction operation. Accordingly, the extraction-isolation apparatus itself can be simplified in construction, a high level of skill for the operation is not necessary and the management of the preparation processes becomes easier. Furthermore, since the hot red peppers having higher stability and low-cost from the aspect of the supply of raw materials than the sweet red peppers are used as the raw material, the production cost can be reduced.

The technique which isolates and removes smelling substances from the red pepper oleoresin as the starting material in the same way as the method of the present invention and uses the extraction residue as the red coloring matter is disclosed in U.S. Pat. No. 4,400,398 and Japanese Patent Laid-Open Publication No. 112659/1988. However, the starting material in these methods is paprica (a sweet red pepper) but is not the hot red pepper that is utilized in the present invention. These endorse the fact that when a hot red pepper oleoresin contains the pungent taste component, it has been believed difficult to extract the pungent taste component to the level of "No pungent taste" by the organoleptic evaluation test using the supercritical gas extraction.

DETAILED DESCRIPTION OF THE INVENTION

Figure 1:
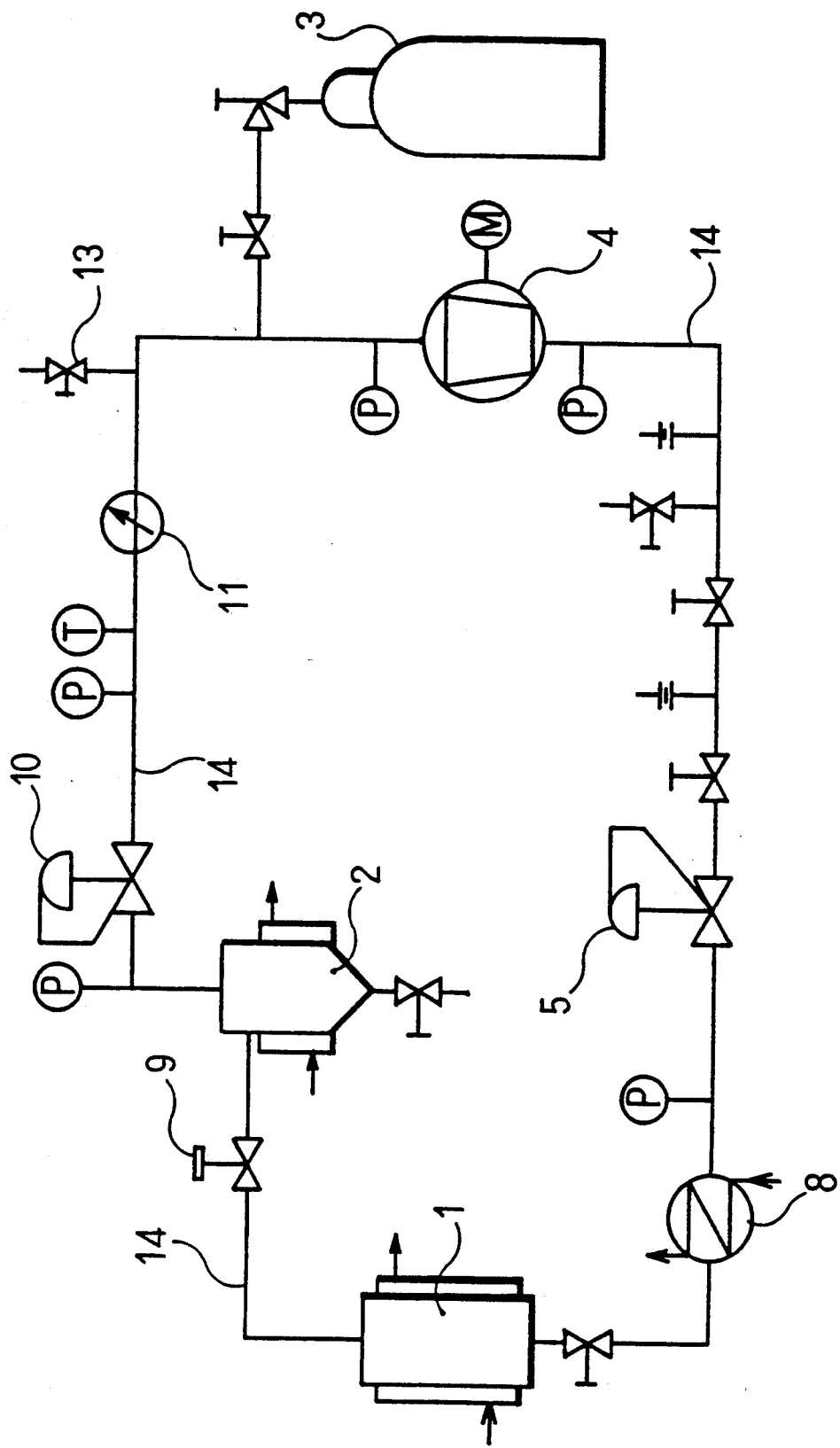
FIG. 1 is a flow sheet showing an example of a set of supercritical gas extraction apparatus which is employed when a red coloring matter is prepared from a hot red pepper oleoresin in accordance with the present invention.

The present invention will be explained in further detail.

(1) The term "hot red pepper" as the raw material for the red coloring matter of the present invention represents those Guinea peppers which have a pungent taste component and is the concept opposite to a "sweet red pepper" like a paprica not containing the pungent taste component. In other words, this term generally includes those red peppers containing the pungent taste component, and also paprica and some other red peppers, which are normally believed as not containing the pungent taste component, actually containing pungent taste even if it is very small amount.

The examples of the hot red peppers include anaheime, cayenne, chili, and so forth.

(2) The term "oleoresin" represents the oily matter which is obtained by extraction from the fruits (mainly the dried and pulverized product) of the red peppers by known extractions such as the supercritical gas extraction, a solvent extraction, an oil immersion, and the like, and in which the pungent taste component, the smelling component and other impurities are dissolved with the coloring component in the seed oil (triglycerides, etc).

(3) Explanation for "supercritical gas extraction" is made below.

The supercritical gas (a gas at a temperature and a pressure exceeding the critical temperature and the critical pressure) has the characteristic of dissolving a substance having chemical affinity. Separation of a specific substance can be made by utilizing this characteristic. This operation is referred to as the "supercritical gas extraction". Since this supercritical gas extraction can easily separate an extracting reagent from a solute and can be executed within a relatively low temperature range, this is effective as a separation method for thermally unstable substances.

The critical temperature of the carbon dioxide used as the extracting reagent gas in the present invention is 31.1° C. and its critical pressure is 75.4 kgf/cm$^2$.

(4) The most characterizing feature of the process for preparing the coloring matter in accordance with the present invention lies in that impurities containing the pungent taste component of the hot red pepper oleoresin are removed from the hot red pepper oleoresin by the supercritical gas extraction using the carbon dioxide gas as the extracting reagent. The term "impurities containing the pungent taste component" used herein includes the pungent taste component, the smelling component, unsaponifiable matters, the residual organic solvent, and the like.

The carbon dioxide used as the extracting reagent gas described above generally has a pressure of from 100 to 200 kgf/cm$^2$ and a temperature of from 31.1° C. to 70° C. If the pressure is less than 100 kgf/cm$^2$, it becomes difficult to extract and remove the impurities containing the pungent taste component and the smelling component, and if it exceeds 200 kgf/cm$^2$, on the other hand, the coloring component, too, is undesirably extracted. If the temperature is less than 31.1° C., the carbon dioxide cannot be brought into the supercritical gas state, and if it exceeds 70° C., on the other hand, denaturation is likely to occur undesirably in the coloring component.

(5) The process of the present invention will be definitely explained using the supercritical gas extraction-isolation apparatus shown in FIG. 1.

① The hot red pepper oleoresin as the starting material is charged into an extraction tank 1.

② The carbon dioxide supplied from a carbon dioxide tank 3 is compressed by a compressor 4 and is brought into the supercritical state through a heat-exchanger 8.

③ The carbon dioxide under the supercritical state described above is poured into the extraction tank 1 and is brought into contact with the hot red pepper oleoresin.

④ In this case, the pungent taste component and other impurities are extracted and isolated and are introduced into a separation tank with the carbon dioxide (that is, extracting reagent).

⑤ Since the internal pressure of the separation tank 2 is reduced, the impurities containing the pungent taste component and the carbon dioxide are separated and the pungent taste component is taken out.

⑥ In the extraction residue of the extraction tank 1 remains the red component oil having the red coloring component from which the pungent taste component is removed and the red coloring matter is taken out.

(6) The evaluation result by the organoleptic test of the red natural coloring matter thus prepared proves to be "No pungent taste" although the primary starting material is the hot red pepper oleoresin.

(7) When the red coloring matter prepared in the process described above is concentrated and purified by the supercritical gas extracting using the carbon dioxide as the extracting reagent, the extracting residue can be preferably used as the red coloring matter having an increased color value.

In other words, when concentration and purification are carried out, the residual impurities are removed as the extract and at the same time, part of yellow and orange group pigments other than the red pigment is extracted and isolated, and a red coloring matter having a high color value (CV) of at least 100,000 and devoid of the pungent taste can be produced. The pressure and the temperature of the carbon dioxide as the extracting reagent gas at this time are 100 to 200 kgf/cm$^2$ and 31.1° to 70° C., respectively, being some condition form of removal of the pungent taste component.

PREFERRED EMBODIMENTS

The present invention will be explained in further detail with based on the examples. The extraction-isolation apparatus shown in FIG. 1 was actually used.

EXAMPLE 1

First, 250 kg of hot red pepper oleoresin (capsaicin content: 3.98%, color value (CV): 8,500) extracted from a hot red pepper (powder) by the supercritical gas extraction method was charged into an extraction tank 1 having a 500 l capacity, and the pungent taste component and the red pigment component were extracted and isolated under the processing conditions of an extraction pressure and temperature of 160 kgf/cm$^2$ and 40° C., an isolation pressure and temperature of 60 kgf/cm$^2$ and 40° C. and a carbon dioxide flow rate of 2,000 kg/h. As the result, 68 kg of a natural red coloring matter and 174 kg of an extract containing the pungent taste component were obtained. The natural red coloring matter had a color value of 24,300 and a ratio of absorbances of 1.005 and had a high quality. The result of evaluation of this red coloring material by the organoleptic test was "No pungent taste".

EXAMPLE 2

250 kgf of the red coloring matter prepared in Example 1 was charged into the extraction tank 1 and was processed under the conditions of an extraction pressure and temperature of 150 kgf/cm$^2$ and 40° C., an isolation pressure and temperature of 60° C. and 40° C. and a carbon dioxide flow rate of 2,000 kg/h. As the result 55 kgf of the concentrated and purified red coloring matter was obtained. The concentrated red coloring matter had a color value of 108,000 and a ratio of absorbances of 1.010 and had an extremely high quality. The result of evaluation of this red coloring matter by the organoleptic test was, of course, "No pungent taste". The capsaicin content being the pungent taste component did not reach a detection limit value of 0.01%.

What is claimed is:

1. A process for preparing a red coloring matter free of pungent taste from a hot red pepper oleoresin having a pungent taste component which comprises extracting the pungent taste component from the oleoresin with carbon dioxide at a pressure of from 100 to 200 kgf/cm$^2$ and at a temperature of from 31.1° to 70° C.

2. The red coloring matter produced by the process of claim 1.

* * * * *